United States Patent
Lee et al.

(10) Patent No.: US 6,290,058 B1
(45) Date of Patent: *Sep. 18, 2001

(54) DOCUMENT STORAGE DEVICE WITH COMBINATION DISK AND CD STORAGE RETAINER

(75) Inventors: Fei-Chen Lee, Taipei (TW); Alex Hofstetter, Cranston, RI (US)

(73) Assignee: Beautone Specialties Ltd., Southborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,769

(22) Filed: Oct. 20, 1999

Related U.S. Application Data

(60) Provisional application No. 60/105,264, filed on Oct. 22, 1998, and provisional application No. 60/157,738, filed on Oct. 5, 1999.

(51) Int. Cl.[7] .................................................. B65D 85/57
(52) U.S. Cl. .................. 206/232; 206/307.1; 206/312
(58) Field of Search ................................ 206/232, 307.1, 206/308.1, 308.3, 309, 311–313, 425; 229/67.1–67.4, 75; 281/45, 31; 402/79

(56) References Cited

U.S. PATENT DOCUMENTS

| | | | |
|---|---|---|---|
| 758,379 | * | 4/1904 | Noseworthy ............................ 229/75 |
| 1,221,884 | * | 4/1917 | Martin ................................. 229/67.1 |
| 3,643,363 | | 2/1972 | Biro . |
| 4,165,193 | | 8/1979 | Gestetner . |
| 4,294,558 | | 10/1981 | Errichiello . |
| 4,477,013 | | 10/1984 | Herrin . |
| 4,549,658 | * | 10/1985 | Sfikas ................................... 206/312 |
| 4,549,688 | | 10/1985 | Ozmon et al. . |
| 4,566,590 | * | 1/1986 | Manning et al. ..................... 226/232 |
| 4,629,349 | | 12/1986 | Pitts . |
| 4,973,298 | | 11/1990 | Ferguson . |
| 5,031,772 | * | 7/1991 | Woodriff .............................. 206/312 |
| 5,050,792 | | 9/1991 | Segall . |
| 5,161,731 | | 11/1992 | Rivlin et al. . |
| 5,199,743 | | 4/1993 | Rosinski, III . |
| 5,207,717 | * | 5/1993 | Manning .............................. 206/232 |
| 5,275,438 | | 1/1994 | Struhl . |
| 5,288,144 | * | 2/1994 | Guderyon ............................ 206/232 |
| 5,445,264 | * | 8/1995 | Uchida .............................. 206/308.3 |
| 5,445,417 | | 8/1995 | Bromer et al. . |
| 5,476,570 | | 12/1995 | Widmann . |
| 5,545,087 | | 8/1996 | Seward . |
| 5,579,908 | | 12/1996 | Johnson . |
| 5,752,589 | | 5/1998 | Berg . |
| 5,947,279 | * | 9/1999 | Lee et al. ............................. 206/232 |

* cited by examiner

Primary Examiner—Luan K. Bui
(74) Attorney, Agent, or Firm—Ernest V. Linek; Banner & Witcoff, Ltd.

(57) ABSTRACT

Disclosed is a document storage and/or transport system with a permanently attached media storage member specifically designed to hold two different sizes of computer media. The storage member is dual-purpose; one part of the storage member is sized to hold 3½ disks and the other part of the storage member is sized to hold compact discs or similar sized computer media. Advantageously, the dual-purpose media storage member of the present invention is formed from a single sheet of rigid material that is shaped during manufacture to form necessary perforations and bending lines therein. The media storage member is adapted to be mounted either on the inside or on the outside of one or more covers of various paper storage devices, including binders, portfolios, envelopes, file folders, and the like.

18 Claims, 5 Drawing Sheets

DOCUMENT STORAGE DEVICE WITH COMBINATION DISK AND CD STORAGE RETAINER

CROSS-REFERENCE TO RELATED APPLICATIONS

This application is related to two copending Provisional Applications, Ser. No. 60/105,264, filed Oct. 22, 1998, and Ser. No. 60/157,738, filed Oct. 5, 1999, the disclosures of which are hereby incorporated herein by reference.

BACKGROUND OF THE INVENTION

Plastic storage devices for documents, such as binders, envelopes, portfolios and the like, have been widely used and have been the subject of numerous patent filings. See for example: U.S. Pat. No. 5,752,589, which describes a reusable pouch; U.S. Pat. No. 5,545,087, which describes storage pockets for file folders; U.S. Pat. No. 5,476,570, which describes an apparatus to make plastic seamed jackets, reinforced jacket structures, and the like; U.S. Pat. No. 5,445,417, which describes a presentation folder and method of making; U.S. Pat. No. 5,275,438, which describes a file folder with attached computer disc pocket; U.S. Pat. No. 5,161,731, which describes a reinforced expandable folder; U.S. Pat. No. 4,973,298, which describes a method for making a gusseted plastic container; U.S. Pat. No. 4,629,349, which describes a flexible transparent notebook and the like; U.S. Pat. No. 4,549,688, which describes an expandable file folder; U.S. Pat. No. 4,477,013, which describes a see-through file folder; U.S. Pat. No. 4,294,558, which describes weatherproof portfolios manufactured from molded thermoplastic polymer; U.S. Pat. No. 4,165,193, which describes a loose-leaf folder; and U.S. Pat. No. 3,643,363, which describes a reusable file folder.

SUMMARY OF THE INVENTION

The present invention is directed to a document storage and/or transport system with a permanently attached media storage member specifically designed to hold two different sizes of computer media. The storage member is dual-purpose; one part of the storage member is sized to hold 3½ disks and the other part of the storage member is sized to hold compact discs or similar sized computer media. Advantageously, the dual-purpose media storage member of the present invention is formed from a single sheet of rigid material that is shaped during manufacture to form necessary perforations and bending lines therein. The media storage member is adapted to be mounted either on the inside or on the outside of one or more covers of various paper storage devices, including binders, portfolios, envelopes, file folders, and the like.

In its most preferred embodiments, the present invention is directed to improved document storage devices. Storage of removable computer media, such as compact discs (CDs), zip-drive disks, 3½ inch disks (1.44 MB) and HiFD (3½ inch disks holding 200 MB) and the papers related thereto is often a problem, because while papers may be readily stored in envelopes, portfolios, binders, and the like, computer media is often lost from such devices, as they are intended primarily for storage or transport of paper.

The present invention provides a simple and inexpensive solution to this problem, by providing a portable document storage and/or transport system with a permanently attached media storage member specifically designed to hold two different sizes of computer media. As described below, the storage member is dual-purpose; one part of the storage member is sized to hold 3½ disks and the other part of the storage member is sized to hold compact discs or similar sized computer media (e.g., DVD, zip-disks, etc.)

Advantageously, the dual-purpose media storage member of the present invention is formed from a single sheet of rigid material (plastic, heavy paper, cardboard, or the like) that is shaped during manufacture (e.g., with a cutting/creasing steel rule) to form necessary perforations and bending lines therein.

During manufacture of a suitable document storage device, such as storage envelopes, file folders, portfolios, binders, and the like, the dual-purpose media storage member would be assembled by folding the one-piece member into the final configuration and permanently affixing the same to an inner portion of the envelope, folder, portfolio or binder. In this manner, papers associated with the computer media are retained safely and securely in the same location as the media itself.

DETAILED DESCRIPTION OF THE PREFERRED EMBODIMENTS

Figure 1:
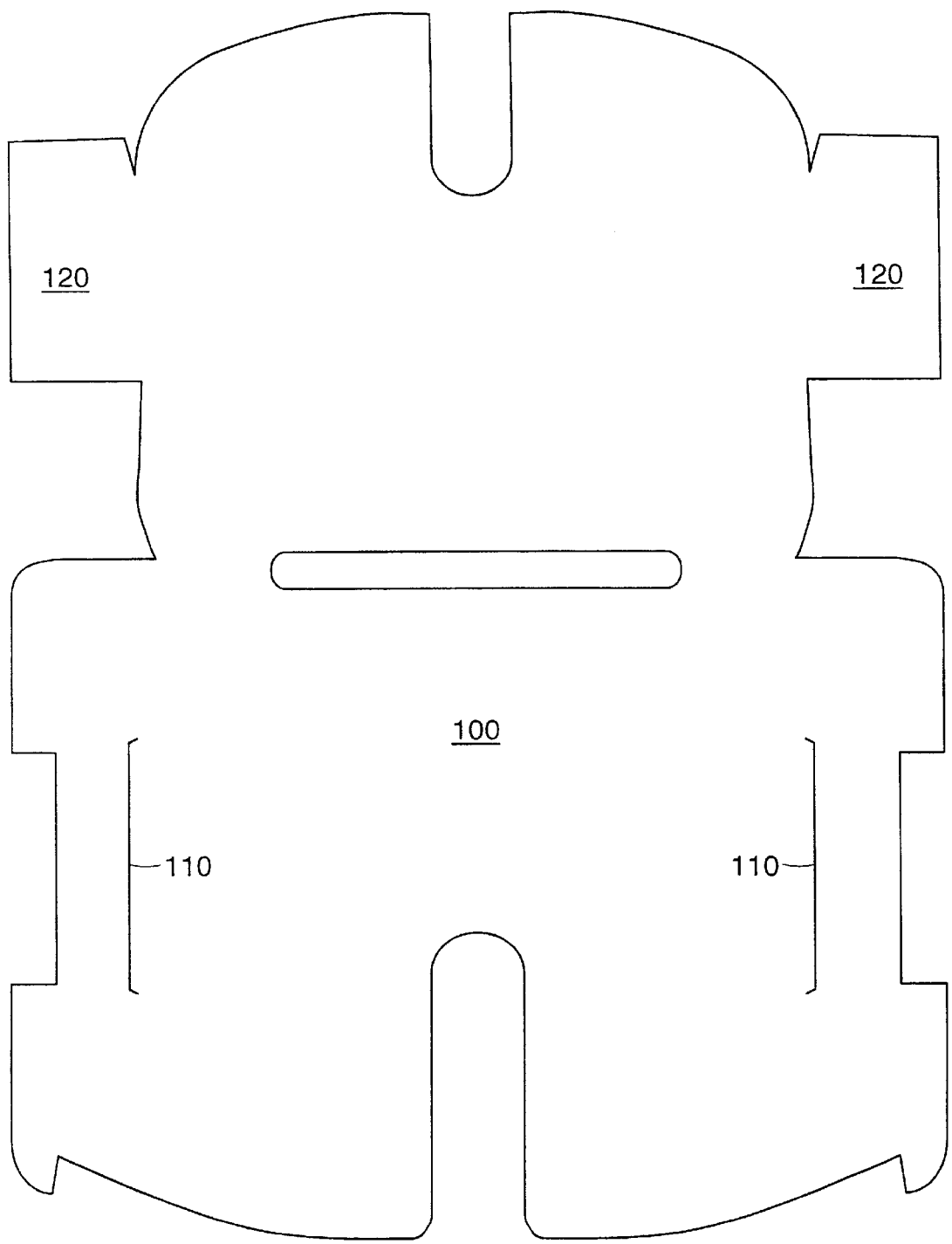
FIG. 1 illustrates one particularly preferred embodiment of the storage member of the present invention, in its open, or "as manufactured" configuration.

As illustrated in the drawings accompanying this specification, the present invention is directed to a dual-purpose storage system for two sizes of computer media. When used in conjunction with a document storage device, e.g., envelopes, binders, file folders, portfolios, and the like, the dual-purpose storage system of the present invention provides a convenient mode of storing computer media and the hard copy (papers) associated therewith.

The preferred media storage member of the present invention is a foldable plastic construct, provided with a plurality of slots (130, 150), slits (110) and holes (140), to enable the unit to be manipulated into a unitary member that will hold two different sizes of computer media—advantageously a CD and a 3.5 inch disk. Any document storage device can be modified according to the teachings of the present invention by the addition of the media holder described herein.

Figure 2:
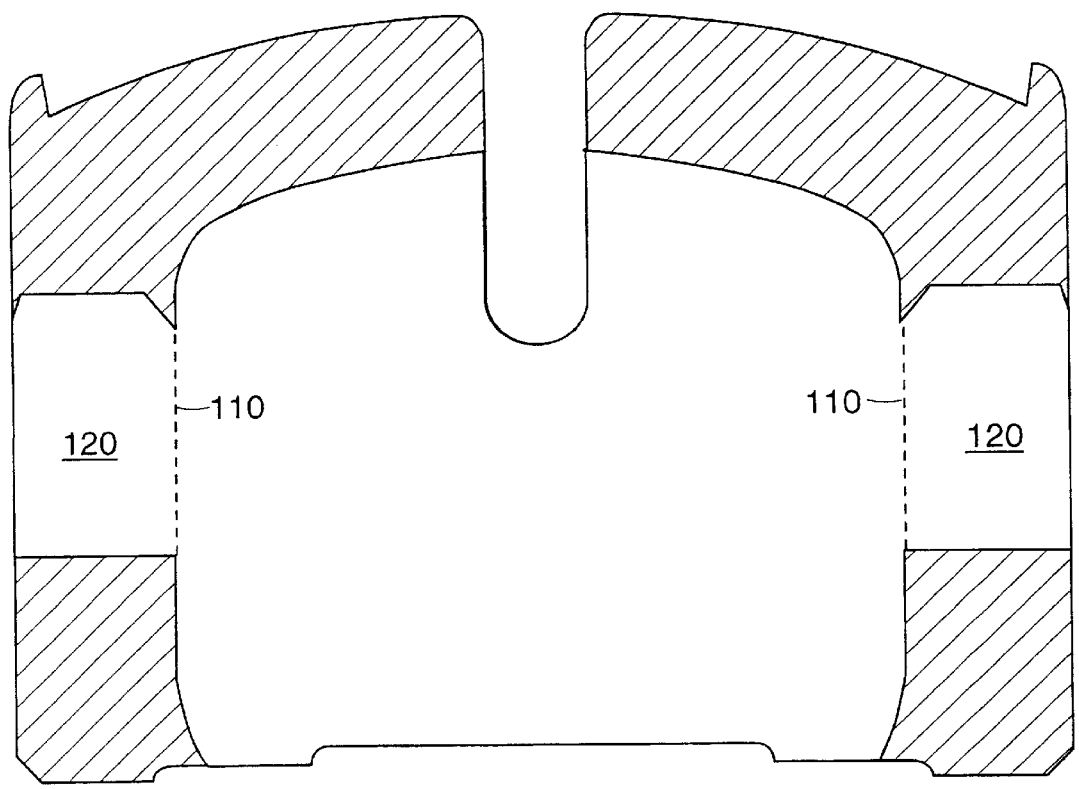
FIG. 2 shows the storage member of FIG. 1, folded at the mid-point, prior to final assembly.
Figure 3:
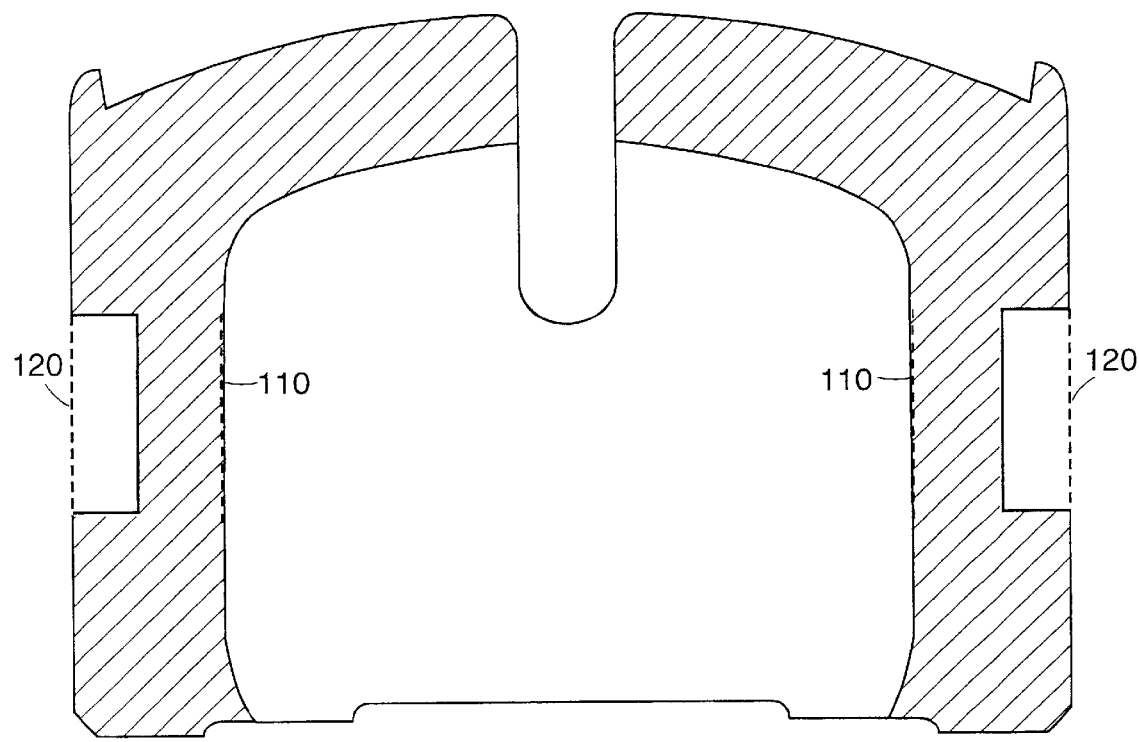
FIG. 3 shows the storage member of FIGS. 1 and 2, in the final assembly configuration.

FIGS. 1, 2 and 3 illustrate one particularly preferred embodiment of the media storage member of the present invention, in its open, or "as manufactured" configuration. This embodiment shows the unitary construction of the storage member (100). The embodiment shown in FIG. 1 can be readily "stamped" out of plastic, heavy paper, or like materials.

FIG. 2 shows the media storage member of FIG. 1, folded at the mid-point, prior to final assembly. As illustrated, two slots are provided (110) and the two wings (120) are designed to lock into these slots (see FIGS. 2 and 3), to complete the storage member. FIG. 3 shows the media storage member of FIGS. 1 and 2, in the final assembly configuration, with the wings (120) placed through the slots (110), completing the assembly.

Figure 4:
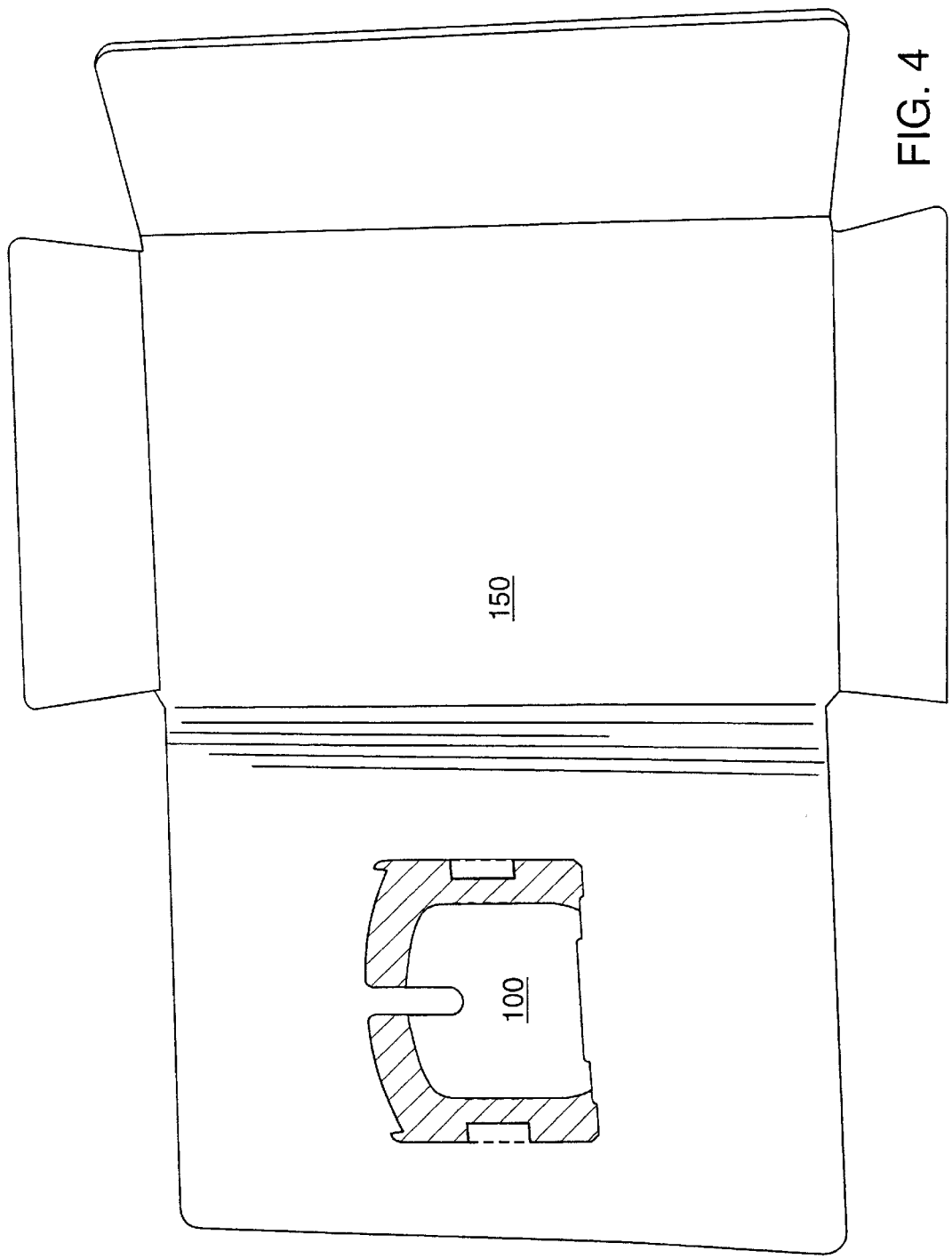
FIG. 4 shows the storage member of FIG. 3, permanently mounted to the inside front cover of one preferred document storage device—a "document wallet".

FIG. 4 shows the media storage member of FIG. 3, permanently mounted to the inside front cover of one preferred document storage device—a "document wallet" (150). Such storage devices are commercially available from a number of manufacturers, including Beautone Specialties Co., Ltd. In this case, the plastic dual-purpose storage member has been "welded" to the inside plastic cover of the wallet. As the skilled artisan will readily appreciate, the mounting method will vary depending upon the nature of the materials being joined. Adhesives and other mounting methods can be used as necessary.

Figure 5:
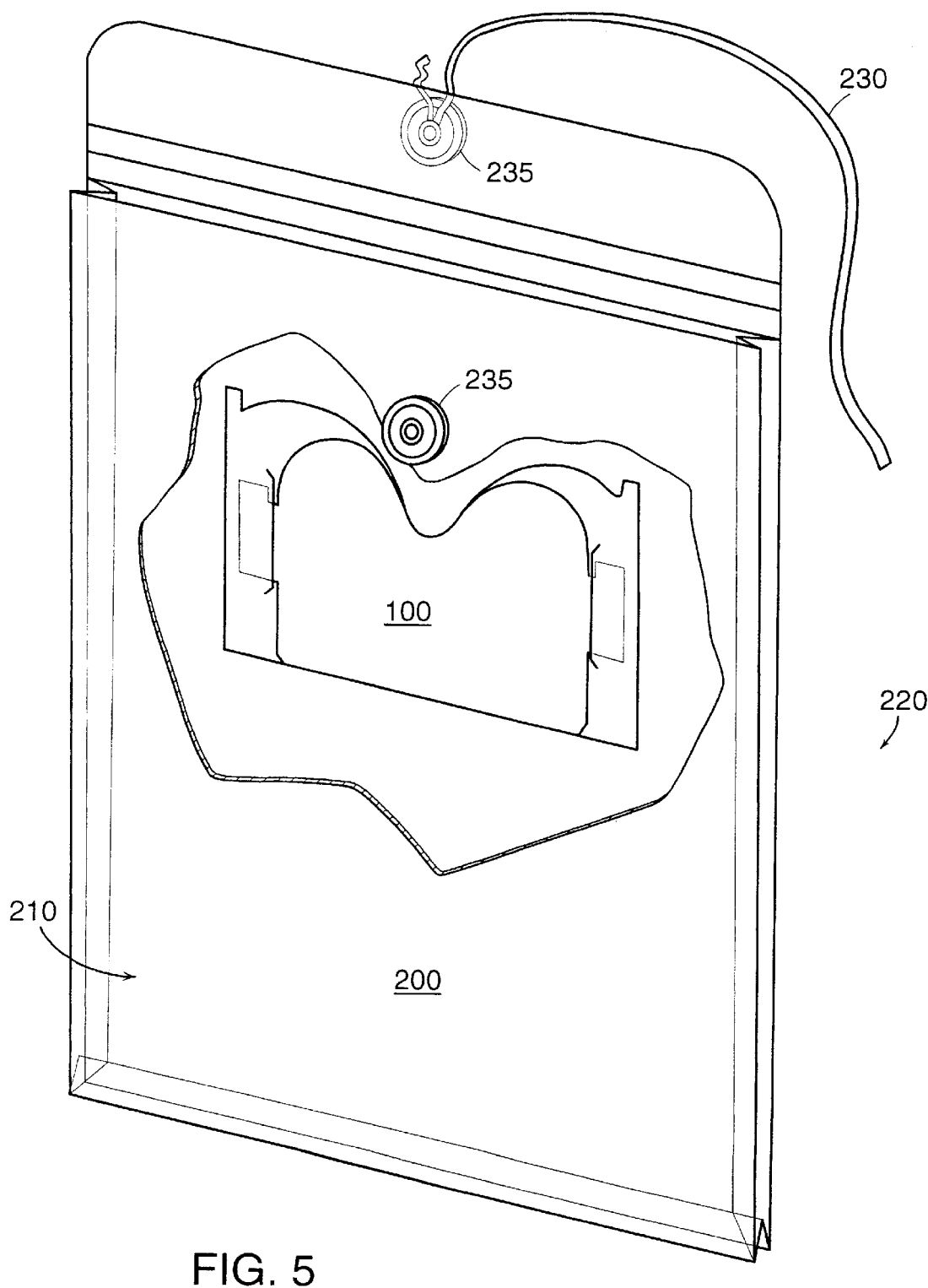
FIG. 5 shows the storage member of FIG. 3, permanently mounted to an inside wall of another preferred document storage device—a "string envelope".

FIG. 5 shows the media storage member of FIG. 3, permanently mounted to the inside front cover of another preferred document storage device—a "string envelope" (200). While this type of envelope is closed with the string (230) wrapping around posts (235), other closure methods for envelopes may likewise be suitable, such as snaps, Velcro® brand hook and loop fasteners, and the like.

Envelope type storage devices are commercially available from a number of manufacturers, including Beautone Specialties Co., Ltd. In this case, the plastic dual-purpose storage member has been "welded" to one of the inside walls of the envelope. As the skilled artisan will readily appreciate, the mounting location of the media storage member is not critical; the front wall (220), the back wall (210), or both walls, may be used for the situs of the media storage member. As above, the attachment method will vary depending upon the nature of the materials being joined. Adhesives and other mounting methods can be used as necessary.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. In a document storage device comprising at least two joined members, one member forming a front cover of the document storage device and the other member forming the back cover of the device, the joined members thereby defining an inside front and back face and an outside front and back face on the two joined members; the improvement comprising:

a permanently mounted, on at least one of said joined members, computer media storage member consisting of a single sheet of rigid material folded into a two pocket configuration, in which one of the pockets of the storage member is defined by one of said joined members to which the storage member is mounted;

said media storage member being adapted for holding two different sizes of computer media; one pocket of the storage member being sized to hold computer media the size of a 3½ inch disk and the other pocket of the storage member being sized to hold computer media the size of a compact disc.

2. The document storage device of claim 1, wherein the media storage member comprises foldable plastic.

3. The document storage device of claim 1, wherein the media storage member is mounted on the inside face of the front cover member.

4. The document storage device of claim 1, wherein the media storage member is mounted on the inside face of the back cover member.

5. The document storage device of claim 1, wherein the media storage member is mounted on the outside face of the front cover member.

6. The document storage device of claim 1, wherein the media storage member is mounted on the outside face of the back cover member.

7. The document storage device of claim 1, wherein the document storage device is selected from the group consisting of binders, portfolios, envelopes, and file folders.

8. The document storage device of claim 1, wherein the document storage device comprises a document wallet.

9. The document storage device of claim 1, wherein the document storage device comprises a string envelope.

10. In a document transport device comprising at least two joined members, one member forming a front cover of the document storage device and the other member forming the back cover of the device, the joined members thereby defining an inside front and back face and an outside front and back face on the two joined members; the improvement comprising:

at least ones permanently mounted, on a of said joined members, computer media storage member consisting of a single sheet of rigid material folded into a two pocket configuration, in which one of the pockets of the storage member is defined by one of said joined members to which the storage member is mounted;

said media storage member being adapted for holding two different sizes of computer media; one pocket of the storage member being sized to hold computer media the size of a 3½ inch disk and the other pocket of the storage member being sized to hold computer media the size of a compact disc.

11. The document transport device of claim 10, wherein the media storage member comprises foldable plastic.

12. The document transport device of claim 10, wherein the media storage member is mounted on the inside face of the front cover member.

13. The document transport device of claim 10, wherein the media storage member is mounted on the inside face of the back cover member.

14. The document transport device of claim 10, wherein the least one media storage member is mounted on the outside face of the front cover member.

15. The document transport device of claim 10, wherein the media storage member is mounted on the outside face of the back cover member.

16. The document transport device of claim 10, wherein the document transport device is selected from the group consisting of binders, portfolios, envelopes, and file folders.

17. The document transport device of claim 10, wherein the document transport device comprises a document wallet.

18. The document transport device of claim 10, wherein the document transport device comprises a string envelope.

* * * * *